United States Patent
Milde

(10) Patent No.: US 7,987,707 B2
(45) Date of Patent: Aug. 2, 2011

(54) WIND TUNNEL WITH A MODEL ARRANGED THEREIN, PARTICULARLY A MODEL OF AN AIRCRAFT, FOR ACQUIRING AND EVALUATING A PLURALITY OF MEASURING DATA, AS WELL AS METHOD

(75) Inventor: Uwe Milde, Bassum (DE)

(73) Assignee: Airbus Deutschland GmbH (DE)

( * ) Notice: Subject to any disclaimer, the term of this patent is extended or adjusted under 35 U.S.C. 154(b) by 242 days.

(21) Appl. No.: 11/990,350

(22) PCT Filed: Aug. 11, 2006

(86) PCT No.: PCT/EP2006/007992
§ 371 (c)(1),
(2), (4) Date: Mar. 25, 2009

(87) PCT Pub. No.: WO2007/020030
PCT Pub. Date: Feb. 22, 2007

(65) Prior Publication Data
US 2009/0320582 A1 Dec. 31, 2009

(30) Foreign Application Priority Data
Aug. 12, 2005 (DE) .......................... 10 2005 038 205

(51) Int. Cl.
*G01M 9/00* (2006.01)
(52) U.S. Cl. ......................................................... 73/147
(58) Field of Classification Search .................. None
See application file for complete search history.

(56) References Cited

U.S. PATENT DOCUMENTS

| 5,045,699 A | 9/1991 | Schulze et al. |
| 5,218,863 A | 6/1993 | Mangalam |
| 5,627,311 A * | 5/1997 | Nakaya et al. .................. 73/147 |

(Continued)

FOREIGN PATENT DOCUMENTS

DE 3826379 10/1989

(Continued)

OTHER PUBLICATIONS

Braun M J et al. "Full field flow visualization and computer-aided velocity measurements in a bank cylinders in a wind tunnel" Experiments in fluids spinger, Heidelberg, DE vol. 13, No. 2/3, Jan. 1992 pp. 117-127. International Search Report, PCT/EP2006/007992.

*Primary Examiner* — Lisa Caputo
*Assistant Examiner* — Jermaine Jenkins
(74) *Attorney, Agent, or Firm* — Lerner, David, Littenberg, Krumholz & Mentlik, LLP

(57) ABSTRACT

A wind tunnel with a model arranged therein, particularly a model of an aircraft, for acquiring and evaluating a plurality of measuring data, wherein the wind tunnel comprises at least one computer unit and at least one visual display terminal, particularly at least one monitor, as well as at least one sensor for acquiring the measuring data. A plurality of measuring data of the wind tunnel, particularly measuring data on flow and/or pressure conditions on the model and/or in the region of the model, which data are determinable by the at least one sensor, can be processed in real time and with consideration of geometrical data of the model by the at least one computer unit and visualized on the at least one visual display terminal during a wind tunnel measurement.

8 Claims, 1 Drawing Sheet

U.S. PATENT DOCUMENTS

Figure 1:
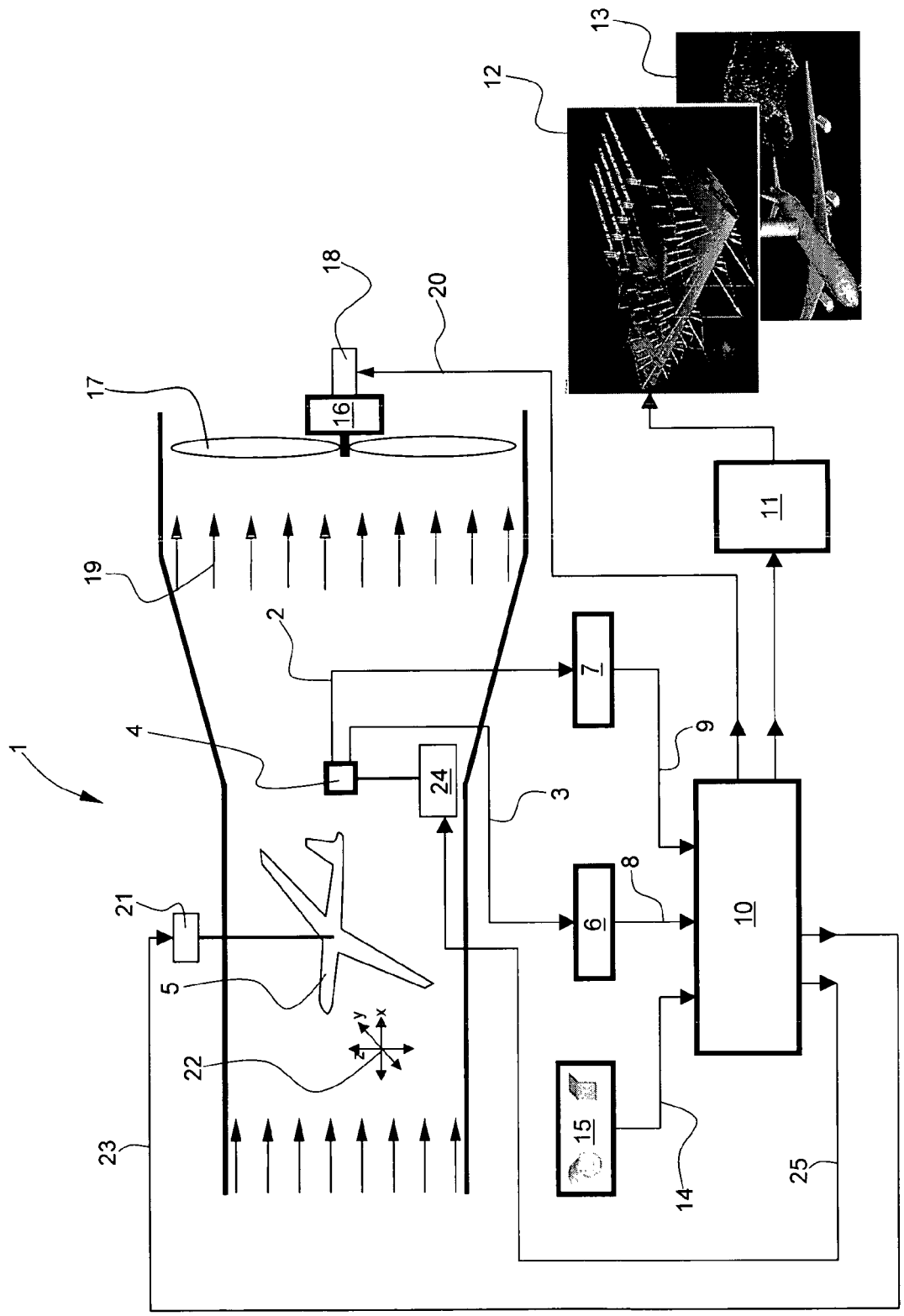

| | | | |
|---|---|---|---|
| 5,731,995 A | 3/1998 | Benne et al. | |
| 5,756,891 A * | 5/1998 | Nakaya et al. | 73/147 |
| 5,866,813 A * | 2/1999 | Nakaya et al. | 73/147 |
| 6,470,740 B2 * | 10/2002 | Li | 73/147 |
| 6,550,332 B2 * | 4/2003 | Lee | 73/583 |
| 6,571,618 B2 | 6/2003 | Demay et al. | |
| 2004/0253107 A1 | 12/2004 | Page et al. | |

FOREIGN PATENT DOCUMENTS

| | | |
|---|---|---|
| EP | 0472243 | 2/1992 |
| EP | 0478780 B1 | 4/1992 |
| EP | 1024457 B1 | 8/2000 |
| EP | 1167941 | 1/2002 |
| WO | 97/39334 | 10/1997 |

* cited by examiner ns data to wind tunnel measurement
WIND TUNNEL WITH A MODEL ARRANGED THEREIN, PARTICULARLY A MODEL OF AN AIRCRAFT, FOR ACQUIRING AND EVALUATING A PLURALITY OF MEASURING DATA, AS WELL AS METHOD This application claims the benefit of the filing date of German Patent Application No. 10 2005 038 205.3 filed Aug. 12, 2005, the disclosure of which is hereby incorporated herein by reference.

FIELD OF INVENTION

The invention relates to a wind tunnel with a model arranged therein, particularly a model of an aircraft, for acquiring and evaluating a plurality of measuring data, wherein the wind tunnel comprises at least one computer unit and at least one visual display terminal, particularly a monitor, as well as at least one sensor for acquiring the measuring data.

The invention furthermore relates to a method for acquiring and evaluating a plurality of measuring data of a wind tunnel with a model arranged therein, particularly a model of an aircraft, wherein the measuring data of the wind tunnel determined by at least one sensor, particularly measuring data on pressure and flow conditions on the model and/or in the region of the model, is transmitted to at least one computer unit with at least one visual display terminal, particularly at least one monitor.

TECHNOLOGICAL BACKGROUND

In the evaluation of measuring data of known wind tunnels, the measuring data is displayed at least numerically and, if so required, illustrated two-dimensionally on a computer monitor and/or a printer, for example, in the form of an xy plot for reasons of better presentability. During an ongoing wind tunnel measurement, individual measuring points usually are already output on a monitor during the measurement, wherein a printout of a measurement series that consists of a plurality of individual measurements only allows a comprehensive data analysis for interpretation purposes after the data acquisition is completed. Until now, an evaluation of the data and the measures to be derived thereof, for example, a change of the setting points or the like, could only take place after a human visual inspection.

SUMMARY OF THE INVENTION

An object of the present invention is to largely eliminating the above-described disadvantages of known wind tunnel embodiments and the disadvantages in acquiring and evaluating measuring data obtained from known wind tunnel systems, respectively.

The objective is attained with a wind tunnel according to the features of Claim 1.

The plausibility of the measuring data obtained from the wind tunnel according to the invention can be quickly checked due to the fact that the plurality of measuring data of the wind tunnel, particularly measuring data on the flow conditions and/or pressure conditions on the model and/or in the region of the model that is acquired by the at least one sensor, can be processed in real time and with consideration of geometrical data of the model by the at least one computer unit, as well as visualized on the at least one visual display terminal during a wind tunnel measurement. In this case, the geometrical data of the wind tunnel model preferably originates from a CAD program that was used for its construction.

According to another exemplary embodiment of the wind tunnel, it is proposed that the visualization of the measuring data is realized by the at least one computer unit in the form of a three-dimensional graphic illustration on the at least one visual display terminal. This allows a particularly descriptive illustration of the obtained measuring data. The flow and pressure conditions in the region of the model arranged in the wind tunnel are preferably illustrated in the form of three-dimensional vectors that allow an intuitive analysis of the air flow.

According to another exemplary embodiment of the wind tunnel, it is proposed that a three-dimensional graphic illustration of the measuring data on the at least one visual display terminal is interactively influenceable by a control device.

The control device is preferably realized in the form of a three-dimensional mouse, a joystick or the like such that a user is able to freely move within the flow conditions in the wind tunnel that are visualized in the form of three-dimensional vectors by actuating the control device.

According to another exemplary embodiment of the wind tunnel, it is proposed that a position in space of the at least one sensor is variable by at least one positioning device in dependence on the measuring data and under the control of the computer unit.

The measuring data transmitted by the at least one sensor is initially evaluated in real time by the computer unit in order to determine parameters (Kennwerte), wherein the position of the sensor in the wind tunnel can be varied, if so required, based on these parameters. This may make it possible to displace the at least one sensor, for example, into vortex core regions (Wirbelkernbereiche) of the air flow in the wind tunnel, wherein the control or the adjustment of the sensor positioning process is also monitored by the computer unit. Consequently, the three-dimensional graphic illustration can be automatically focused on aerodynamically relevant and/or interesting regions of the air flow, for example, turbulent regions.

According to another exemplary embodiment, it is proposed that a position in space of the model can be varied by a positioning device in dependence on the measuring data and under the control of the computer unit.

This embodiment may make it possible to also vary the position in space of the model, for example, the angle of attack of the model relative to the air flow in the wind tunnel, in dependence on the measuring data and under the control and/or regulating of the computer unit. This may be necessary, for example, if the evaluation of the measuring data by the computer unit results in parameters that indicate turbulences in the air flow.

According to another exemplary embodiment of the wind tunnel, it is proposed that the computer unit is able to influence operating parameters of the wind tunnel, particularly the speed of a driving motor of a wind tunnel fan, in dependence on the measuring data with the aid of a wind tunnel control system.

The speed of the air flow in the wind tunnel therefore may be influenced by the computer unit. In addition, other operating parameters of the wind tunnel such as, for example, the air temperature of the air flow can also be varied, if so required, under the control and/or regulating of the computer unit.

The objective of the invention is also attained with a method with the features of Claim 6.

A reliable analysis of the measuring data obtained from the wind tunnel measurement, particularly a plausibility check, may already be carried out during an ongoing wind tunnel measurement due to the fact that the measuring data is evaluated in the at least one computer unit in real time and with consideration of the geometrical data of the model, as well as visualized on the at least one visual display terminal during a wind tunnel measurement.

SHORT DESCRIPTION OF THE DRAWINGS

Other advantageous embodiments of the wind tunnel and the method are disclosed in the other claims.

The figures show:

FIG. 1, a schematic representation of a wind tunnel according to an embodiment with a model arranged therein.

DETAILED DESCRIPTION OF AN EXEMPLARY EMBODIMENT

The wind tunnel as well as the inventive method used for evaluating wind tunnel data are described in greater detail below with reference to FIG. 1.

FIG. 1 shows the schematic design of a wind tunnel for acquiring and evaluating measuring data.

Measuring data 2, 3, particularly on flow and pressure conditions, is acquired in a wind tunnel 1 by a sensor 4, for example, in a rear region of a model 5 of an aircraft. Such measurements make it possible, for example, to measure wake vortices. The sensor 4 may be, for example, a so-called "5-hole probe." The sensor 4 can be arbitrarily positioned within the wind tunnel 1. Instead of using the sensor 4 that can be freely positioned in space, a plurality of sensors could also be integrated into the model 5, for example, in order to determine the flow and pressure conditions in the region of the airfoils.

The measuring data 2, 3 is pre-processed in the measuring transducers 6, 7, for example, amplified, attenuated, filtered, delayed or suitably altered in a different way. The prepared measuring data 8, 9 is subsequently fed to a computer unit 10.

The prepared measuring data 8, 9 is converted into parameters and a three-dimensional illustration in the computer unit 10 in order to achieve the most descriptive visualization of the measuring data 8, 9 possible. The three-dimensional illustrations of the measuring data 8, 9 are displayed by the computer unit 10 on a visual display terminal 11, for example, a monitor. An exemplary three-dimensional graphic illustration 12 shows flow and pressure conditions in the region of the upper side of the airfoil of the model 5. Another three-dimensional graphic illustration 13 shows, for example, flow and pressure conditions in a rear region of the model 5, namely a so-called wake vortex. In the three-dimensional graphic illustrations 12, 13 shown, different measuring data 8, 9 may be respectively highlighted, if so required, with different colours in order to realize a more concise illustration for an observer.

The updating of the three-dimensional graphic illustrations 12, 13 of the flow and pressure conditions takes place in real time, i.e., already during the ongoing wind tunnel measurement. This makes it possible to save time and to simultaneously realize a simple intuitive plausibility check of the prepared measuring data 8, 9 such that the detection of measuring errors is simplified. In addition, the time required for aerodynamic optimizations can be reduced, for example, because the effects of changes to the model geometry can be directly observed and/or evaluated based on the three-dimensional graphic illustration of the flow and pressure conditions.

A not-shown control device, for example, in the form of a three-dimensional mouse, a joystick or the like makes it possible to respectively vary the viewing angle of the three-dimensional graphic illustrations 12, 13 on the visual display terminal 11 or the position of a virtual observer referred to the model 5 in the wind tunnel 1 in real time.

In order to take into account the spatial shape of the model 5 for generating the three-dimensional graphic illustrations 12, 13 of the flow and pressure conditions as accurately as possible, a plurality of geometrical data 14 of the model 5 is also input into the computer unit 10. The geometrical data 14 may be derived, for example, from a construction system 15 that was used for developing the model 5 and contains the corresponding three-dimensional data. The geometrical data 14 is preferably present in the form of surface points with three respective space coordinates.

The computer unit 10 may be realized in the form of a digital computer, for example, as a powerful standard PC, a workstation or the like. The communication between the sensor 4, the measuring transducers 6, 7, the computer unit 10 and the construction system 15 is realized with known standardized information transmission systems, for example, Ethernet®, Profi-Bus® or the like.

The wind tunnel 1 furthermore features a driving motor 16 for driving a fan 17, wherein said fan as well as other not-shown devices of the wind tunnel 1 are controlled or regulated with the aid of a wind tunnel control system 18. The wind tunnel control system 18 makes it possible, in particular, to vary the speed of the driving motor 16 and therefore the flow speed of an air flow 19 that is generated by the fan 17 and flows through the wind tunnel 1. The wind tunnel control system 18 is connected to the computer unit 10 by a control line 20.

An optional positioning device 21 makes it possible to almost arbitrarily vary the position in space of the model 5 in the wind tunnel 1, namely also during an ongoing measurement. The movements of the model 5 in the direction of the x-axis, the y-axis and the z-axis of the space are illustrated in the form of a coordinate system 22. In addition, the option of pivoting the model 5, for example, about at least the y-axis of the coordinate system 22 may also be provided.

The positioning device 21 for varying the position of the model 5 in the wind tunnel 1 is connected to the computer unit 10 by another control line 23. The position of the model 5 is changed by the positioning device 21 and controlled or regulated in real time by the computer unit 10. For this purpose, the computer unit 10 is able to determine parameters from the measuring data 2, 3, 8, 9, wherein these parameters make it possible to determine nominal position values for varying the position of the model 5. For example, the angle of attack of the model 5 referred to the air flow 19 can be reduced by the positioning device 21 under the control or regulating of the computer unit 10 if aerodynamic anomalies, for example, turbulences or the like, occur in certain regions of the air flow 19. In this case, the positioning device 21 changes the position of the model 5 relative to the air flow 19 until the nominal position values predetermined by the computer unit 10 are reached.

Analogously, the sensor 4 is realized such that it is freely positionable in all directions of the space by the positioning device 24. The control or regulating of the positioning device 24 is also realized with the computer unit 10, wherein the computer unit 10 is connected to the positioning device 24 of the sensor 4 by the control line 25.

Among other things, the option of freely positioning the sensor 4 in space makes it possible, if so required, to automatically focus the three-dimensional graphic illustrations 12, 13 generated by the computer unit 10 on aerodynamically relevant or critical regions of the air flow 19, for example, turbulences in the region of the model 5. This can be realized, for example, by calculating the so-called "circulation" (Zirkulation) from the measuring data 2, 3, 8, 9 of a sensor 4 that is realized, for example, in the form of a "5-hole probe." The calculation of the "circulation" makes it possible to determine the presumed position of a vortex core (Wirbelkerns) in the air flow 19. This parameter pertains to the spatial position of the vortex core and is transmitted from the computer unit 10 to the positioning device 24 in the form of a nominal position value for the spatial position of the sensor 4 such that the sensor 4 is automatically displaced to this nominal position value that is determined by the computer unit 10 and usually represents a suitable measuring position for the three-dimensional graphic illustration as well as the evaluation.

It is furthermore possible, for example, to vary the flow speed of the air flow 19 with the aid of the wind tunnel control system 18 or even the speed of an engine simulator (TPS) on the model 5 under the control of the computer unit 10 in order to obtain a certain speed ratio between the engine jet generated by the engine simulator and the flow speed of the air flow 19. If so required, the temperature of the air flow 19 can also be controlled or regulated by the computer unit 10 in dependence on the measuring data 2, 3, 8, 9.

The control lines 20, 23, 25 may also be realized in the form of known information transmission systems, for example, Ethernet®, Profibus® or the like. Instead of using the exemplary sensor 4 shown, it would also be conceivable to arrange a plurality of sensors in the region of the model 5 or even directly on the model 5. It is furthermore possible to utilize sensors that determine a plurality of measuring data, for example, along a line (so-called "rake sensors" (Rechensensoren)). If several sensors are provided in the wind tunnel 1, they are preferably arranged on separate positioning devices such that the positions in space of the sensors can be respectively controlled independently of one another by the computer unit 10.

The inventive method is carried out as described below:

During the course of the respective ongoing measurement on the model 5 in the wind tunnel 1, the sensor 4 continuously acquires measuring data 2, 3 that is forwarded to the measuring transducers 6, 7. The measuring data 2, 3 is subjected to suitable metrological processing in the measuring transducers 6, 7. The thusly prepared measuring data 8, 9 is forwarded to the computer unit 10 for additional processing. In the computer unit 10, the numerical measuring data 8, 9 is converted into a three-dimensional graphic illustration 12, 13 by taking into account the geometrical data 14 of the construction system 15, wherein said three-dimensional graphic illustration is visualized on a visual display terminal 11 in real time. The three-dimensional graphic illustrations 12, 13 that represent flow and pressure conditions in the region of the model 5 in the wind tunnel 1 at a certain point in time are generated with very high speed and therefore almost without delay, i.e., in real time, such that it is already possible to contemplate the plausibility of the measuring data 2, 3, 8, 9 during an ongoing wind tunnel measurement. In addition, the effects of changes to the geometry of the model 5, for example, in order to aerodynamically optimize the model 5 or the like, can be almost immediately visualized on the visual display terminal 11 such that thus far protracted optimization processes can be significantly accelerated.

As discussed above in the description of the wind tunnel 1, the computer unit 10 is able to determine a plurality of parameters. For example, the position of the sensor 4, the position of the model 5 in the wind tunnel 1, the speed of the driving motor 16 of the fan 17 and therefore the flow speed of the air flow 19 in the wind tunnel 1 can be respectively varied in real time based on these parameters and under the control or regulating of the computer unit 10.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

List of Reference Symbols
1 Wind tunnel
2 Measuring data
3 Measuring data
4 Sensor
5 Model
6 Measuring transducer
7 Measuring transducer
8 Measuring data (prepared)
9 Measuring data (prepared)
10 Computer unit
11 Visual display terminal
12 Three-dimensional graphic illustration
13 Three-dimensional graphic illustration
14 Geometrical data
15 Construction system
16 Driving motor
17 Fan
18 Wind tunnel control system
19 Air flow
20 Control line
21 Positioning device (model)
22 Coordinate system
23 Control line
24 Positioning device (sensor)
25 Control line

The invention claimed is:

1. A wind tunnel with a model of an aircraft arranged therein for acquiring and evaluating a plurality of measuring data, the wind tunnel comprising:
   at least one computer unit; and
   at least one visual display terminal; and
   at least one sensor for acquiring the measuring data,
   wherein the plurality of measuring data of the wind tunnel, comprises measuring data on flow and/or pressure conditions on the model and/or in the region of the model, wherein the measuring data is determinable by the at least one sensor, is processable in real time and with consideration of geometrical data of the model by the at least one computer unit during an ongoing wind tunnel measurement and is visualizable on the at least one visual display terminal during a wind tunnel measurement, and
   wherein the position in space of at least one sensor is variable by at least one positioning device in dependence on the measuring data and under the control of the computer unit.

2. The wind tunnel of claim 1, wherein the measuring data are visualizable on the at least one visual display terminal in the form of a three-dimensional graphic illustration by the at least one computer unit.

3. The wind tunnel of claim 1, wherein the three-dimensional graphic illustration of the measuring data on the at least one visual display terminal is interactively influenceable by a control device.

4. The wind tunnel of claim 1, wherein a position in space of the model is variable by a positioning device in dependence on the measuring data and under the control of the computer unit.

5. The wind tunnel of claim 1, wherein the speed of a driving motor of a fan of the wind tunnel, is influenceable by the computer unit in dependence on the measuring data with the aid of a wind tunnel control system.

6. A method for acquiring and evaluating a plurality of measuring data of a wind tunnel with a model of an aircraft arranged therein, comprising:

transmitting the measuring data of the wind tunnel that is acquired by at least one sensor, particularly measuring data on pressure and flow conditions on the model and/or in the region of the model, to at least one computer unit with at least one visual display terminal; processing the measuring data in real time and with consideration of geometrical data of the model in the at least one computer unit and visualized on the at least one visual display terminal during a wind tunnel measurement; and varying the position in space of the at least one sensor by at least one positioning device in dependence on the measuring data and under the control of the computer unit and the at least one sensor is positioned in in vortex core regions of an air flow.

7. The method of claim 6, wherein the visualization on the at least one visual display terminal is realized in the form of a three-dimensional graphic illustration.

8. The method of claim 6, wherein a position in space of the model is varied by a positioning device in dependence on the measuring data and under the control of the computer unit.

* * * * *